United States Patent
Sugano et al.

(10) Patent No.: US 10,005,412 B2
(45) Date of Patent: Jun. 26, 2018

(54) VEHICLE FRONT PORTION STRUCTURE

(71) Applicant: TOYOTA JIDOSHA KABUSHIKI KAISHA, Toyota-shi (JP)

(72) Inventors: Chitoshi Sugano, Toyota (JP); Tatsuya Komamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/270,503

(22) Filed: Sep. 20, 2016

(65) Prior Publication Data

US 2017/0120850 A1    May 4, 2017

(30) Foreign Application Priority Data

Nov. 2, 2015   (JP) .................................. 2015-215823

(51) Int. Cl.
| | |
|---|---|
| *B60R 19/52* | (2006.01) |
| *B62D 21/11* | (2006.01) |
| *B60R 19/34* | (2006.01) |
| *B62D 21/15* | (2006.01) |
| *B62D 25/08* | (2006.01) |

(52) U.S. Cl.
CPC .............. *B60R 19/52* (2013.01); *B60R 19/34* (2013.01); *B62D 21/155* (2013.01); *B62D 25/082* (2013.01); *B62D 21/11* (2013.01)

(58) Field of Classification Search
CPC ....... B60R 19/52; B60R 19/34; B62D 21/155; B62D 21/11; B62D 25/082
USPC .................................................... 296/187.09
See application file for complete search history.

(56) References Cited

U.S. PATENT DOCUMENTS

| | | | |
|---|---|---|---|
| 2011/0316295 A1 | 12/2011 | Yamada et al. | |
| 2012/0248820 A1* | 10/2012 | Yasui | ...................... B60R 19/34 296/187.09 |
| 2013/0256051 A1* | 10/2013 | Nakamura | ........... B62D 21/155 180/271 |

FOREIGN PATENT DOCUMENTS

JP       2012-6545       1/2012

* cited by examiner

*Primary Examiner* — Joseph D. Pape
*Assistant Examiner* — Dana D Ivey
(74) *Attorney, Agent, or Firm* — Oblon, McClelland, Maier & Neustadt, L.L.P.

(57) ABSTRACT

A vehicle front portion structure includes: a suspension member, first and second crash boxes, a front cross member and braces. The braces extends obliquely outward in a vehicle width direction and toward a vehicle rearward direction, with front end portions of the braces being fastened to the front cross member and rear end portions of the braces being fastened to arm portions. The braces are equipped with radiator support portions that support a radiator provided at a vehicle front side of a power unit, and with easily deformed portions which, when a crash load has been input, become deformation origins that enable the braces to deform in such a way that the rear end portions move closer to the front cross member.

6 Claims, 4 Drawing Sheets

VEHICLE FRONT PORTION STRUCTURE

CROSS-REFERENCE TO RELATED APPLICATION

This application is based on and claims priority under 35 USC 119 from Japanese Patent Application No. 2015-215823 filed on Nov. 2, 2015, which is incorporated by reference herein.

BACKGROUND

Technical Field

The present invention relates to a vehicle front portion structure.

Related Art

Japanese Patent Application Laid-open (JP-A) No. 2012-6545 discloses a vehicle front portion structure. Specifically, the vehicle front portion structure has a right and left pair of front side frames extending in the vehicle forward and rearward direction and a suspension member attached to the front side frames. The suspension member is equipped with a right and left pair of longitudinal members extending in the vehicle forward and rearward direction, and crash boxes are joined to front end portions of the longitudinal members. A front cross member extending in the vehicle width direction is joined to the vehicle front sides of the longitudinal members and the vehicle rear sides of the crash boxes, and the right and left longitudinal members are interconnected in the vehicle width direction by the front cross member. Consequently, the bending stiffness of the suspension member itself is improved, and at the time of a vehicle frontal crash (hereafter this crash mode will be referred to as "at the time of a frontal crash") the crash boxes become crushed and deformed to thereby absorb some of the crash load.

According to the configuration disclosed in JP-A No. 2012-6545, the suspension member is formed in a substantially frame shape as seen in a vehicle plan view. Consequently, the crash load acting in the vehicle rearward direction at the time of a frontal crash is transmitted from the crash boxes via the front cross member to the longitudinal members. That is, the front cross member moves in the vehicle rearward direction as the crash boxes absorb the crash load. However, in the configuration disclosed in JP-A No. 2012-6545, a structure for supporting the radiator is not disclosed. Generally the radiator is placed on the vehicle rear side of the front cross member in the vehicle front portion, but at the time of a frontal crash there is the potential for the crash load input to the radiator to increase as a result of the front cross member displaced in the vehicle rearward direction coming into abutting contact with the radiator. Consequently, the above-described related art has room for improvement in this regard.

SUMMARY

In consideration of the above-described problem, it is an object of the present disclosure to obtain a vehicle front portion structure that can reduce the load input to the radiator at the time of a frontal crash.

A vehicle front portion structure of an aspect of the present disclosure includes: a suspension member that is disposed on the vehicle lower side of a right and left pair of side members placed in a front portion of a vehicle and is supported on the side members, the suspension member having a main body portion extending in the vehicle width direction and a right and left pair of arm portions extending in the vehicle forward direction from both vehicle width direction end portions of the main body portion; first and second crash boxes that are disposed on front end portions of the right and left pair of arm portions and absorb a crash load input from the vehicle front direction; a front cross member that interconnects, in the vehicle width direction, a front end portion of the first crash box and a front end portion of the second crash box; and braces that extend obliquely outward in the vehicle width direction heading in the vehicle rearward direction, with front end portions of the braces being fastened to the front cross member and rear end portions of the braces being fastened to the arm portions, the braces being equipped with radiator support portions that support a radiator disposed on the vehicle front side of a power unit and easily deformed portions which, when a crash load has been input, become deformation origins when allowing the braces to deform in such a way that the rear end portions move closer to the front cross member.

According to the aspect of the present disclosure, the front end portion of one arm portion and the front end portion of the other arm portion of the suspension member are interconnected in the vehicle width direction by the front cross member via the crash boxes. That is, the suspension member is, including the front cross member, formed in a substantially frame shape as seen in a vehicle plan view. Furthermore, the arm portions of the suspension member and the front cross member are also joined to each other by the braces. The braces extend obliquely outward in the vehicle width direction heading in the vehicle rearward direction, with the front end portions of the braces being joined to the front cross member and the rear end portions of the braces being joined to the arm portions of the suspension member. That is, the front cross member, the arm portions, and the braces are interconnected in such a way as to form triangular shapes as seen in a vehicle plan view. The regions formed in the triangular shapes make it difficult for the vehicle front side portion of the suspension member to become deformed and improve its bending stiffness.

Furthermore, the easily deformed portions are disposed in the braces. Consequently, when a crash load is input from the front cross member to the braces at the time of a frontal crash, the vehicle forward and rearward direction lengths of the braces become shorter as a result of the braces becoming deformed about the easily deformed portions in such a way that the rear end portions of the braces move closer to the front cross member, so the crash load acting on the front cross member can be absorbed mainly by the crash boxes. This makes it possible to reduce the crash load input from the front cross member to the radiator.

DESCRIPTION OF THE INVENTION (First Embodiment)

Figure 2:
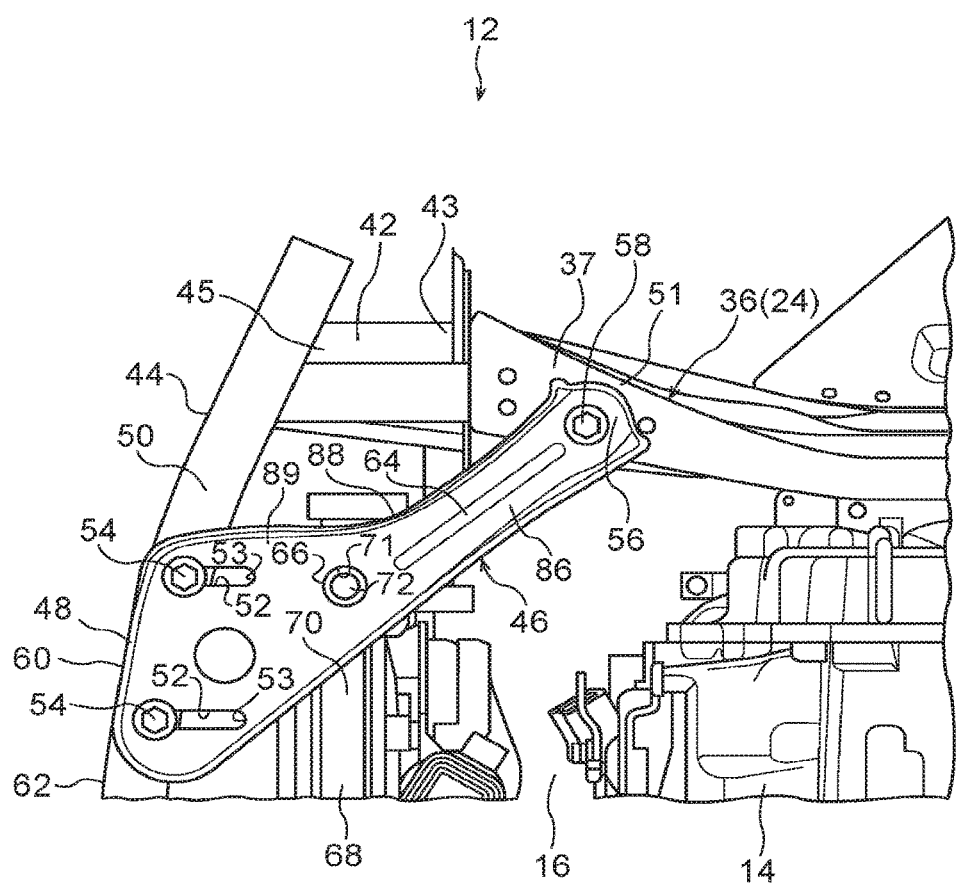
FIG. 2 is a bottom view, seen from the vehicle lower side, of the vehicle front portion equipped with the vehicle front portion structure pertaining to the first embodiment.
Figure 3:
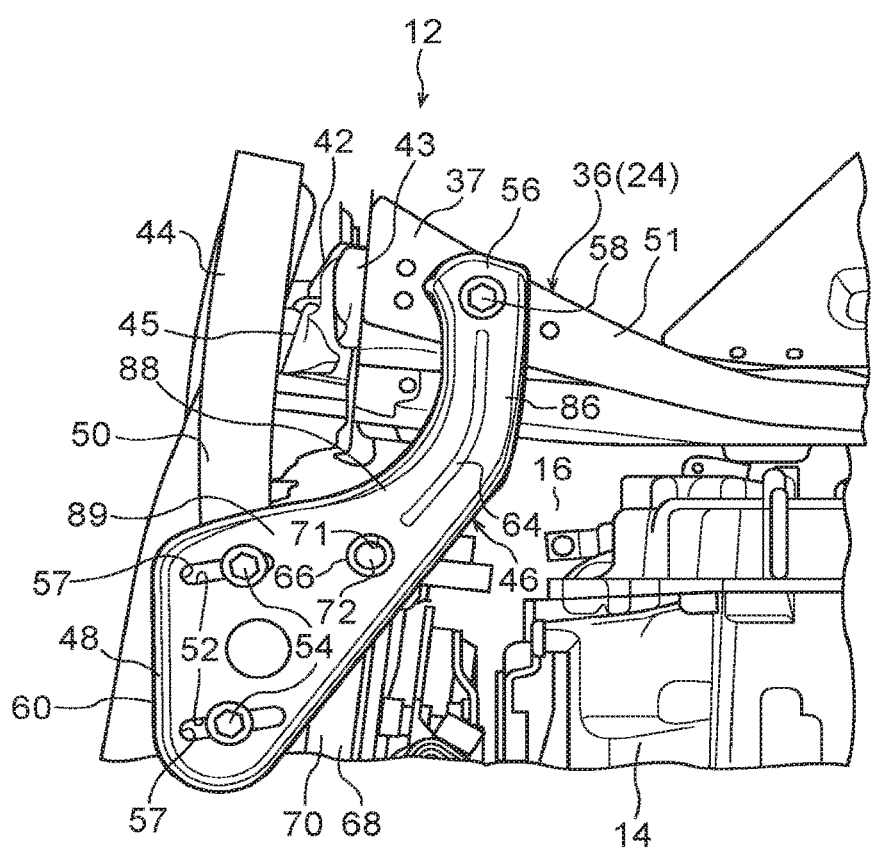
FIG. 3 is a bottom view, seen from the vehicle lower side, of the vehicle front portion after a crash.

A first embodiment of a vehicle front portion structure pertaining to the present disclosure will be described below using FIG. 1 to FIG. 3. It should be noted that arrow FR shown in FIG. 1 indicates a forward direction in the vehicle forward and rearward direction, arrow OUT indicates an outward direction in the vehicle width direction, and arrow UP indicates an upward direction in the vehicle upward and downward direction.

Figure 1:
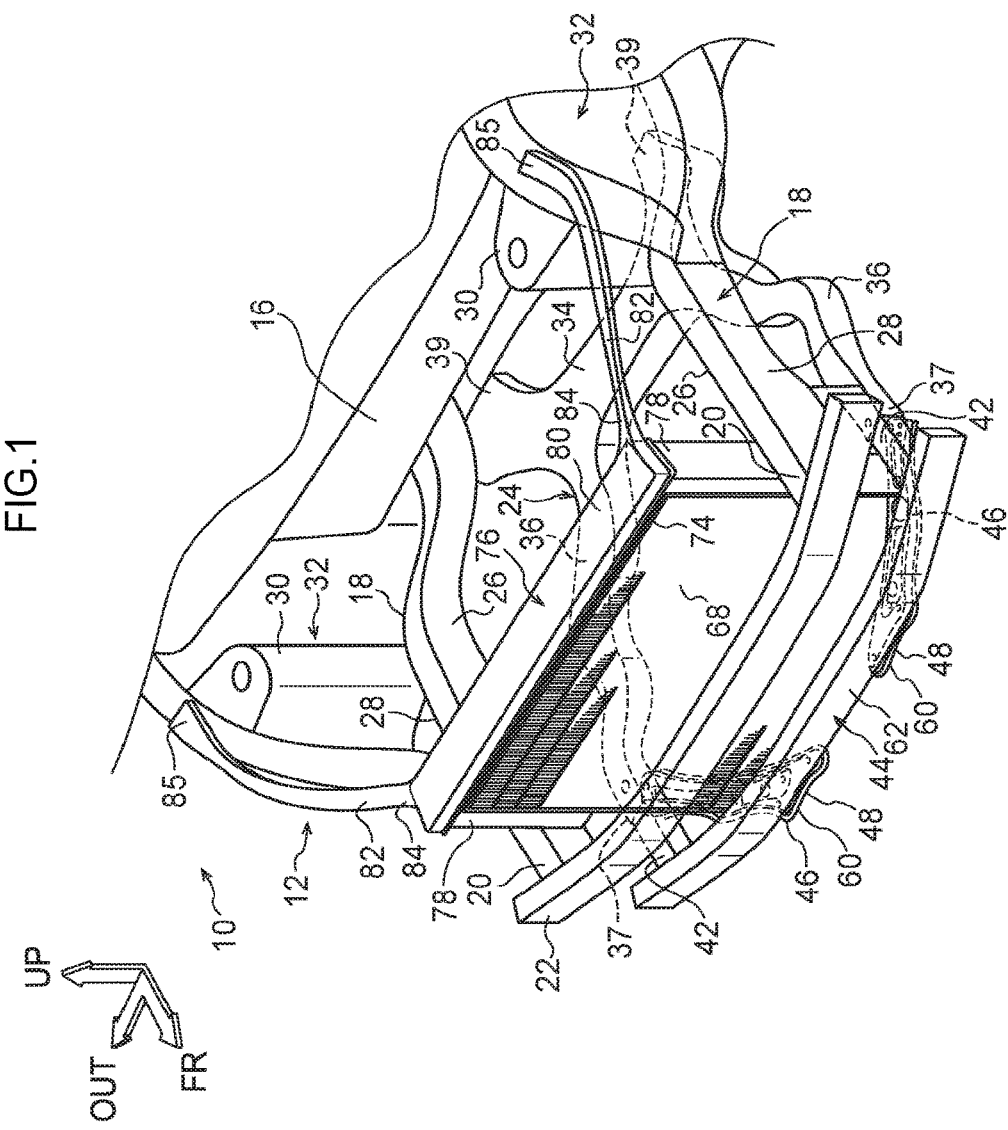
FIG. 1 is a perspective view showing a vehicle front portion equipped with a vehicle front portion structure pertaining to a first embodiment.

As shown in FIG. 1, a front portion 12 of a vehicle 10 is disposed with a power unit compartment 16 in which a power unit 14 (see FIG. 2) is housed. Disposed inside the power unit compartment 16 are a right and left pair of front side members 18 serving as side members spaced an interval apart from each other in the vehicle width direction and extending in the vehicle forward and rearward direction and a bumper reinforcement 22 interconnecting, in the vehicle width direction, front end portions 20 of the right and left pair of front side members 18. Furthermore, the front portion 12 of the vehicle 10 is equipped with a suspension member 24 to which a suspension arm, a steering gear box, and so forth are attached.

The front side member 18 placed on one vehicle width direction side (the right side) and the front side member 18 placed on the other vehicle width direction side (the left side) are line symmetric about a hypothetical line disposed extending along the vehicle forward and rearward direction in the center of the vehicle width direction. The right and left pair of front side members 18 have rectangular cross sections as cut along the vehicle width direction. Furthermore, the front side members 18 are, for example, each formed by joining an inner panel 26 placed on the vehicle width direction inside and extending along the forward and rearward direction and an outer panel 28 placed on the vehicle width direction outside of the inner panel 26 and extending along the forward and rearward direction. The power unit 14 is supported via power unit mounts on the front side members 18 thus described. Furthermore, wheel well inner members 32, in which are formed suspension towers 30 that support upper end portions of suspensions, are joined to the right-side front side member 18 and the left-side front side member 18.

The bumper reinforcement 22 has a substantially rectangular cross section as cut along the vehicle forward and rearward direction, and the bumper reinforcement 22 extends in such a way that its longitudinal direction coincides with the vehicle width direction on the inside of a bumper cover. Furthermore, the bumper reinforcement 22 is attached to the front end portions 20 of the front side members 18 via crash boxes. Because of this, the front end portion 20 of the right-side front side member 18 and the front end portion 20 of the left-side front side member 18 are interconnected in the vehicle width direction by the bumper reinforcement 22.

The suspension member 24 is placed on the vehicle lower side of the front side members 18 and is supported on the front side members 18. The suspension member 24 is formed in a substantially H-shape as seen in a vehicle plan view. Specifically, the suspension member 24 is equipped with a main body portion 34 extending in the vehicle width direction and a right and left pair of arm portions 36 extending in the vehicle forward direction from both vehicle width direction end portions of the main body portion 34. It should be noted that although in the present embodiment the suspension member 24 is configured by steel, for example, the suspension member 24 is not limited to this and may also be configured by another metal such as aluminum alloy.

The right-side arm portion 36 and the left-side arm portion 36 are line symmetric about a hypothetical line disposed extending along the vehicle forward and rearward direction in the center of the vehicle width direction. Furthermore, rear-side extension portions 39 extending in the vehicle rearward direction from the main body portion 34 are formed on the arm portions 36 on the vehicle rear side of the main body portion 34. The rear-side extension portions 39 of the arm portions 36 are supported via bolts or the like on vehicle rear side regions of the front side members 18.

A front cross member 44 is disposed via crash boxes 42 on front end portions 37 of the arm portions 36 of the suspension member 24. The front cross member 44 has a substantially rectangular cross section as cut along the vehicle forward and rearward direction and extends in such a way that its longitudinal direction coincides with the vehicle width direction. It should be noted that the crash boxes 42 are, for example, formed having uniform cross sections (fixed cross sections) by extruding an aluminum alloy material. Specifically, the crash boxes 42 have substantially rectangular cross-sectional shapes at right angles to their longitudinal directions. Additionally, the crash boxes 42 are placed in such a way that their longitudinal direction coincides with the substantially vehicle forward and rearward direction, with base end portions 43 of the crash boxes 42 being fastened by bolts or the like to the front end portions 37 of the arm portions 36. Furthermore, front end portions 45 of the crash boxes 42 are fastened by bolts or the like to the vehicle rear side surface of the front cross member 44.

Braces 46 are disposed between the front end portion 37 of the arm portion 36 placed on one vehicle width direction side (the right side) and the front cross member 44 and between the front end portion 37 of the arm portion 36 placed on the other vehicle width direction side (the left side) and the front cross member 44. As shown in FIG. 2, the braces 46 are each formed in a substantially rectangular shape as seen in a vehicle plan view. Additionally, front end portions 48 of the braces 46 are fastened to a vehicle lower side surface 50 of the front cross member 44 by bolts 54 serving as first fasteners inserted through front end portion sides of later-described fastening holes 52 formed in the braces 46. The fastening positions are set on the vehicle width direction inside of the crash boxes 42 as seen in a vehicle plan view. Furthermore, rear end portions 56 of the braces 46 are coupled by bolts 58 to vehicle lower side surfaces 51 of the front end portions 37 of the arm portions 36. That is, the braces 46 extend obliquely outward in the vehicle width direction heading in the vehicle rearward direction. It should be noted that the brace 46 placed on one vehicle width direction side (the right side) and the brace 46 placed on the other vehicle width direction side (the left side) are line symmetric about a hypothetical line disposed extending along the vehicle forward and rearward direction in the center of the vehicle width direction.

The fastening holes 52 disposed in the front end portions 48 of the braces 46 are formed passing clear through in the plate thickness direction of the braces 46 and are long holes disposed extending in the vehicle rearward direction from the fastening positions of the bolts 54 in such a way that their longitudinal direction coincides with the substantially vehicle forward and rearward direction as seen in a vehicle plan view. The vehicle width direction dimension of the fastening holes 52 is set so as to allow the threaded portions of the bolts 54 to be inserted through the fastening holes 52 and so as to be smaller than the head portions of the bolts 54, so the bolts 54 are kept from moving along the substantially vehicle width direction with respect to the braces 46 and are relatively movable in the vehicle rearward direction. Consequently, the front cross member 44 is also relatively movable in the vehicle rearward direction. Furthermore, so that the bolts 54 are normally placed in front end portions 57 of the fastening holes 52 (see FIG. 3), the front end portions 57 of the fastening holes 52 are placed in positions corresponding to bolt fastening holes formed in the front cross member 44 and through which the bolts 54 are inserted. Additionally, by fastening the bolts 54 in a state in which the bolts 54 have been inserted through the front end portions 57 of the fastening holes 52, a state in which the bolts 54 are placed in the front end portions 57 of the fastening holes 52 is maintained by the fastening force. Moreover, when a force greater than the fastening force of the bolts 54 is input from the vehicle front direction to the front cross member 44, the bolts 54 become placed in rear end portions 53 of the fastening holes 52. At this time, the front end portions 53 of the fastening holes 52 are placed spaced apart from later-described radiator support portions 66 in the vehicle forward and rearward direction so as to maintain a state in which the front cross member 44 and a radiator 68 are spaced apart from each other in the vehicle forward and rearward direction. Consequently, the bolts 54 that relatively move in the vehicle rearward direction are restrained from coming into abutting contact with the radiator 68, and consequently the front cross member 44 is also restrained from coming into abutting contact with the radiator 68. It should be noted that each of the braces 46 is disposed with two fastening holes 52 and two bolts 54 spaced apart from each other in the substantially vehicle width direction.

Front edges 60 of the braces 46 are formed along a front surface 62 of the front cross member 44. That is, the front edges 60 of the braces 46 and the front surface 62 of the front cross member 44 are configured to substantially coincide with each other as seen in a vehicle plan view.

A bead 64 and a radiator support portion 66 are formed in each of the braces 46. The beads 64 project in the vehicle upward direction in the width direction substantial centers of the braces 46 and are disposed extending along the longitudinal direction (extension direction) of the braces 46. That is, the beads 64 are disposed extending outward in the vehicle width direction heading in the rearward direction.

The radiator support portions 66 are disposed in the longitudinal direction substantially center portions of the braces 46. Mount retention holes 71 passing clear through in the plate thickness direction are formed in the radiator support portions 66. Additionally, radiator mounts 72 attached to a vehicle lower side portion 70 of the radiator 68 disposed on the vehicle front side of the power unit 14 are inserted into and retained inside the mount retention holes 71. Consequently, the vehicle lower side portion 70 of the radiator 68 is supported by the braces 46.

Easily deformed portions 88 are formed in the braces 46 on the vehicle rear sides of the radiator support portions 66. The easily deformed portions 88 are set in border sections between fixed width portions 86 whose dimension in the transverse direction of the braces 46 is fixed and variable width portions 89 whose dimension in the transverse direction varies as seen in a vehicle plan view. That is, it is easy for a crash load from the vehicle front direction to concentrate in the easily deformed portions 88. It should be noted that the easily deformed portions 88 may also be set in different positions in accordance with the vehicle. Furthermore, the strength of the easily deformed portions 88 may also be adjusted by disposing cutouts or beads in parts of the easily deformed portions 88.

As shown in FIG. 1, a radiator support 76 is disposed on a vehicle upper side portion 74 of the radiator 68. The radiator support 76 is formed in an inverted U-shape as seen in a vehicle front view by radiator support side members 78 placed on the vehicle width direction outsides of the radiator 68 and joined to the front side members 18 and a radiator support upper member 80 placed on the vehicle upper side of the radiator 68. Furthermore, radiator support supporting members 82 are attached to both vehicle width direction end portions of the radiator support 76. The radiator support supporting members 82 extend in such a way that their longitudinal direction coincides with the substantially vehicle forward and rearward direction, with vehicle front side end portions 84 of the radiator support supporting members 82 being joined to the vehicle width direction end portions of the radiator support upper member 80, for example, and vehicle rear side end portions 85 of the radiator support supporting members 82 being joined to the wheel well inner members 32. Because of this, the vehicle upper side portion 74 of the radiator 68 is supported on the vehicle body via the radiator support 76.

(Action and Effects of First Embodiment)

Next, the action and effects of the present embodiment will be described.

In the present embodiment, as shown in FIG. 1, the front end portion 37 of one arm portion 36 and the front end portion 37 of the other arm portion 36 of the suspension member 24 are interconnected in the vehicle width direction by the front cross member 44 via the crash boxes 42. That is, the suspension member 24 is, including the front cross member 44, formed in a substantially frame shape as seen in a vehicle plan view. Furthermore, the arm portions 36 of the suspension member 24 and the front cross member 44 are also joined to each other by the right and left pair of braces 46. The braces 46 extend obliquely outward in the vehicle width direction heading in the vehicle rearward direction, with the front end portions 48 of the braces 46 being joined to the front cross member 44 and the rear end portions 56 of the braces 46 being joined to the arm portions 36 of the suspension member 24. That is, the front cross member 44, the arm portions 36, and the braces 46 are interconnected in such a way as to form a right and left pair of triangular shapes as seen in a vehicle plan view. The regions formed in the triangular shapes make it difficult for the vehicle front side portion of the suspension member 24 to become deformed and improve its bending stiffness.

Furthermore, the easily deformed portions 88 are disposed in the braces 46. Consequently, as shown in FIG. 3, when a crash load is input from the front cross member 44 to the braces 46 at the time of a frontal crash, the vehicle forward and rearward direction lengths of the braces 46 become shorter as a result of the braces 46 becoming deformed about the easily deformed portions 88 in such a way that the rear end portions 56 of the braces 46 move closer to the front cross member 44, so the crash load acting on the front cross member 44 can be absorbed mainly by the crash boxes 42. This makes it possible to reduce the crash load input from the front cross member 44 to the radiator 68. For these reasons, the load input to the radiator 68 at the time of a frontal crash can be reduced.

Moreover, the fastening holes 52 formed in the braces 46 are configured as long holes disposed extending along the substantially vehicle forward and rearward direction toward the radiator support portions 66. Consequently, when a crash load is input from the vehicle front direction at the time of a frontal crash, the front cross member 44 becomes relatively movable with respect to the braces 46 toward the radiator 68. It should be noted that the fastening holes 52 are formed so as to maintain a state in which the front cross member 44 and the radiator 68 are spaced apart from each other when the bolts 54 have become placed in positions corresponding to the rear end portions 53 of the fastening holes 52. That is, abutting contact between the radiator 68 and the front cross member 44 that has moved can be restrained. Consequently, it becomes possible to further reduce the crash load input from the front side of the radiator 68 to the radiator 68. It should be noted that, by adjusting the dimension and shape of the fastening holes 52, the positional relationship between the front cross member 44 and the radiator 68 following a frontal crash can be adjusted.

Moreover, the easily deformed portions 88 are formed on the opposite sides of the fastening holes 52 across the radiator support portions 66. Consequently, when the bolts 54 of the front cross member 44, which moves along the fastening holes 52 toward the radiator 68 when a crash load is input from the vehicle front direction at the time of a frontal crash, come into abutting contact with the rear end portions 53 of the fastening holes 52, the crash load is applied to the braces 46 themselves, so the braces 46 become deformed about the easily deformed portions 88. That is, the origins of the deformation of the braces 46 can be adjusted by the positions of the easily deformed portions 88, so the positions of the radiator support portions 66 that become displaced by the deformation of the braces 46 can be adjusted, and consequently the post-displacement position of the radiator 68 can be adjusted. Because of this, an adjustment can be made so as to restrain abutting contact between the radiator 68 that becomes displaced and the power unit 14 disposed on the vehicle rear side of the radiator 68, so it becomes possible to further reduce the crash load input from the rear side of the radiator 68 to the radiator 68. Because of this, the load input to the radiator 68 at the time of a frontal crash can be reduced even more.

Furthermore, because the right and left pair of braces 46 support the vehicle lower side portion 70 of the radiator 68, it becomes unnecessary to use a separate part to support the vehicle lower side portion 70 of the radiator 68. That is, generally the radiator 68 is supported by the radiator support 76, but there is no longer the need for the radiator support 76 that supports the radiator 68 to support the vehicle lower side portion 70 of the radiator 68. That is, it becomes possible to curtail the parts (a radiator support lower member) of the radiator support 76. Moreover, because the radiator 68 is supported in regions where the bending stiffness of the suspension member 24 is improved, it becomes possible to control the occurrence of noise caused by vibration of the radiator 68. Because of this, a balance can be achieved between reducing manufacturing costs and improving noise and vibration performance.

Moreover, because the vehicle lower side portion 70 of the radiator 68 is supported by the braces 46, the radiator 68 can be installed inside the power unit compartment 16 of the vehicle 10 at the same time as the power unit 14. Generally the radiator 68 is supported by a radiator support formed in a substantially frame shape, so when attaching the radiator 68 to the inside of the power unit compartment 16, the radiator support upper member of the radiator support is temporarily detached in order to fit the radiator 68 inside the substantially frame-shaped radiator support, and the work of installation is performed from the vehicle front direction. That is, the installation direction of the radiator 68 is different from that of the power unit 14 installed inside the power unit compartment 16 from the vehicle upper direction, so the radiator 68 cannot be installed inside the power unit compartment 16 at the same time as the power unit 14. Consequently, it is necessary to perform hose connection work for interconnecting the power unit 14 and the radiator 68 after the power unit 14 and the radiator 68 have been installed in separate steps inside the power unit compartment 16. This hose connection work needs to be performed by a worker from the vehicle lower side of the vehicle 10, so the ease of the assembly work drops.

In contrast to this, in the present embodiment, the vehicle lower side portion 70 of the radiator 68 is supported by the braces 46, so the radiator 68 can be installed inside the power unit compartment 16 by placing the radiator 68 on the braces 46 from the vehicle upper direction. That is, because the radiator 68 can be installed inside the power unit compartment 16 from the vehicle upper direction like the power unit 14, the power unit 14 and the radiator 68 can be integrally installed inside the power unit compartment 16 by interconnecting beforehand the power unit 14 and the radiator 68 with hoses in a location separate from the assembly line. Thereafter, by attaching the radiator support 76 formed in an inverted U-shape as seen in a vehicle front view to the radiator 68 and the front side members 18 from the vehicle upper side of the radiator 68, the radiator 68 is retained inside the power unit compartment 16. That is, it becomes unnecessary to perform the hose connection work from the vehicle lower side of the vehicle 10 in order to interconnect the power unit 14 and the radiator 68. Because of this, the ease of the assembly work can be improved.

Moreover, the fastening holes 52 are configured as long holes, so when fastening the bolts 54 in order to attach the braces 46 to the front cross member 44, shifts in position in the longitudinal direction of the fastening holes 52 are allowed. That is, installation variations when attaching the braces 46 to the vehicle 10 can be absorbed, so the ease of the assembly work can be further improved.

It should be noted that although in the first embodiment the fastening holes 52 are configured as long holes disposed extending in the vehicle forward and rearward direction, the fastening holes 52 are not limited to this, and the direction in which the fastening holes 52 extend may also be changed in accordance with the crash mode of the vehicle. Specifically, in a case where the front cross member 44 becomes displaced obliquely in the vehicle rearward direction and outward in the vehicle width direction with respect to the braces 46 at the time of a frontal crash, the fastening holes 52 may be configured as long holes disposed extending obliquely in the vehicle rearward direction and outward in the vehicle width direction to thereby to allow the front cross member 44 to be smoothly displaced. Furthermore, in a case where the front cross member 44 becomes displaced obliquely in the vehicle rearward direction and inward in the vehicle width direction with respect to the braces 46 at the time of a frontal crash, the fastening holes 52 may be configured as long holes disposed extending obliquely in the vehicle rearward direction and inward in the vehicle width direction.

Furthermore, the easily deformed portions 88 are set in the border sections between the fixed width portions 86 and the variable width portions 89 of the braces 46, but the easily deformed portions 88 are not limited to this and may also be formed in another position. Furthermore, the vehicle front portion structure may also be given a configuration where beads disposed extending along the substantially vehicle width direction are formed in the braces 46 to thereby allow the braces 46 to bend in the vehicle upward and downward direction.

(Second Embodiment)

Next, a vehicle front portion structure pertaining to a second embodiment of the present disclosure will be described using FIG. 4. It should be noted that the same numbers will be assigned to the same constituent parts as those in the first embodiment and that description of those same constituent parts will be omitted.

Figure 4:
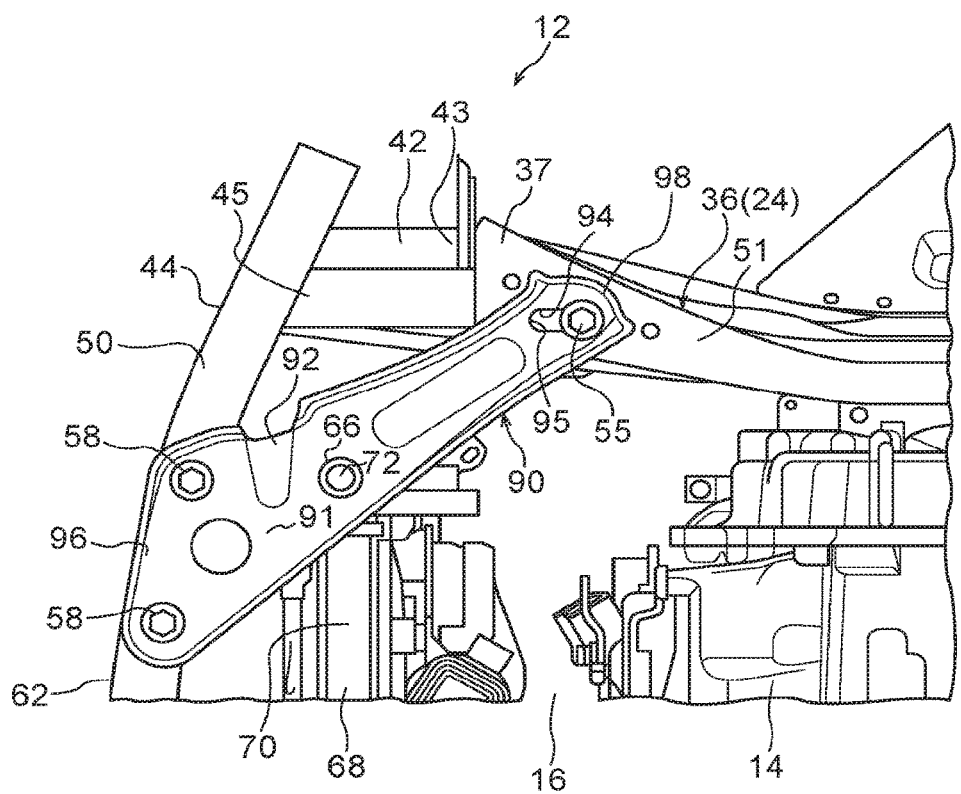
FIG. 4 is a bottom view, seen from the vehicle lower side, of the vehicle front portion equipped with a vehicle front portion structure pertaining to a second embodiment.

As shown in FIG. 4, the vehicle front portion structure pertaining to the second embodiment has the same basic configuration as the vehicle front portion structure of the first embodiment but is characterized in that the positions of easily deformed portions 92 of braces 90 and the positions of fastening holes 94 configured as long holes are different from the positions of the corresponding parts in the first embodiment.

That is, braces 90 are disposed between the front end portion 37 of the arm portion 36 placed on one vehicle width direction side (the right side) and the front cross member 44 and between the front end portion 37 of the arm portion 36 placed on the other vehicle width direction side (the left side) and the front cross member 44. The brace 90 are each formed in a substantially rectangular shape as seen in a vehicle plan view. Additionally, front end portions 96 of the braces 90 are fastened to the vehicle lower side surface 50 of the front cross member 44 by bolts 58 inserted through fastening holes formed in the braces 90. It should be noted that the fastening positions are set on the vehicle width direction inside of the crash boxes 42 as seen in a vehicle plan view. Furthermore, rear end portions 98 of the braces 90 are coupled to the vehicle lower side surfaces 51 of the front end portions 37 of the arm portions 36 by bolts 55 serving as second fasteners inserted through the rear end portion sides of later-described fastening holes 94 formed in the braces 90. That is, the braces 90 extend obliquely outward in the vehicle width direction heading in the vehicle rearward direction. It should be noted that the brace 90 placed on one vehicle width direction side (the right side) and the brace 90 placed on the other vehicle width direction side (the left side) are line symmetric about a hypothetical line disposed extending along the vehicle forward and rearward direction in the center of the vehicle width direction. Furthermore, the front end portion 96 of each brace 90 is fastened by two bolts 58 spaced apart from each other in the substantially vehicle width direction.

The fastening holes 94 disposed in the rear end portions 98 of the braces 90 are formed passing clear through in the plate thickness direction of the braces 90 and are configured as long holes disposed extending in the vehicle forward direction from the fastening positions of the bolts 55 in such a way that their longitudinal direction coincides with the substantially vehicle forward and rearward direction as seen in a vehicle plan view. The vehicle width direction dimension of the fastening holes 94 is set so as to allow the threaded portions of the bolts 55 to be inserted through the fastening holes 94 and so as to be smaller than the head portions of the bolts 55, so the braces 90 are kept from moving along the substantially vehicle width direction and are relatively movable in the vehicle rearward direction with respect to the bolts 55. That is, the braces 90 are relatively movable in the vehicle rearward direction with respect to the arm portions 36. Furthermore, so that the bolts 55 are normally placed in rear end portions of the fastening holes 94, the rear end portions of the fastening holes 94 are placed in positions corresponding to bolt fastening holes formed in the arm portions 36 and through which the bolts 55 are inserted. Additionally, by fastening the bolts 55 in a state in which the bolts 55 have been inserted through the rear end portions of the fastening holes 94, a state in which the bolts 55 are placed in the rear end portions of the fastening holes 94 is maintained by the fastening force. Moreover, when a force greater than the fastening force of the bolts 55 is input from the vehicle front direction to the front cross member 44, the bolts 55 become placed in front end portions 95 of the fastening holes 94. At this time, the front end portions 95 of the fastening holes 94 are placed in positions where they maintain a state in which the radiator 68 and the power unit 14 are spaced apart from each other in the vehicle forward and rearward direction when the bolts 55 have become placed in the front end portions 95 of the fastening holes 94. Consequently, it is ensured that, even when the braces 90 relatively move in the vehicle rearward direction with respect to the arm portions 36 and the front end portions 95 of the fastening holes 94 come into abutting contact with the bolts 55, the radiator 68 and the power unit 14 do not come into abutting contact with each other.

Easily deformed portions 92 are formed in the braces 90 on the vehicle front sides of the radiator support portions 66. The easily deformed portions 92 are formed in the vehicle width direction outside end portions of the braces 90 and are configured as weak portions which have recessed shapes a step in the vehicle upward direction with respect to common surfaces 91 of the braces 90 and in which vehicle width direction outside end portions (ridgelines) are partially cut out. Consequently, it is easy for a crash load from the vehicle front direction to concentrate in the easily deformed portions 92. It should be noted that the easily deformed portions 92 may also be set in different positions in accordance with the vehicle. Furthermore, the strength of the easily deformed portions 92 may also be adjusted by disposing cutouts or beads in parts of the easily deformed portions 92.

(Action and Effects of Second Embodiment)

Next, the action and effects of the second embodiment will be described.

According to the above-described configuration also, the vehicle front portion structure is configured in the same way as the vehicle front portion structure of the first embodiment except that the positions of the easily deformed portions 92 of the braces 90 and the positions of the fastening holes 94 configured as long holes are different, so effects that are the same as those of the first embodiment are obtained. That is, the front cross member 44, the arm portions 36, and the braces 90 are interconnected in such a way as to form a right and left pair of triangular shapes as seen in a vehicle plan view. The regions formed in the triangular shapes make it difficult for the vehicle front side portion of the suspension member 24 to become deformed and improve its bending stiffness.

Furthermore, because the easily deformed portions 92 are disposed in the braces 90, the vehicle forward and rearward direction lengths of the braces 90 become shorter as a result of the braces 90 becoming deformed about the easily deformed portions 92, so the crash load acting on the front cross member 44 can be absorbed mainly by the crash boxes 42. Because of this, the load input to the radiator 68 at the time of a frontal crash can be reduced.

Moreover, the easily deformed portions 92 are formed in positions including the vehicle width direction outside end portions of the braces 90. Because the braces 90 extend obliquely outward in the vehicle width direction heading in the vehicle rearward direction, when a crash load is input from the front cross member 44 to the braces 90 at the time of a frontal crash, the braces 90 become deformed in such a way as to project inward in the vehicle width direction as seen in a vehicle plan view. Consequently, of the transverse direction end portions of the braces 90, tensile loads act on the vehicle width direction inside end portions while compressive loads act on the vehicle width direction outside end portions. For this reason, compressive stress arises in the easily deformed portions 92, but the easily deformed portions 92 have a relatively low stiffness with respect to the compressive loads (a low stiffness compared to the case with respect to the tensile loads), so the braces 90 easily become deformed using the easily deformed portions 92 as origins. That is, by disposing the easily deformed portions 92 in the end portions on which the compressive stress acts, the braces 90 can be more reliably deformed starting at the easily deformed portions 92. Because of this, the load input to the radiator 68 at the time of a frontal crash can be more reliably reduced.

Moreover, the fastening holes 94 formed in the braces 90 are configured as long holes disposed extending along the substantially vehicle forward and rearward direction toward the radiator support portions 66. Consequently, when a crash load is input from the vehicle front direction at the time of a frontal crash, the radiator support portions 66 become relatively movable with respect to the arm portions 36 in the vehicle rearward direction. That is, when a crash load is input from the vehicle front direction at the time of a frontal crash, the braces 90 become relatively movable with respect to the arm portions 36 in the vehicle rearward direction. It should be noted that the fastening holes 94 are formed so as to maintain a state in which the radiator 68 and the power unit 14 are spaced apart from each other when the bolts 55 have become placed in positions corresponding to the front end portions 95 of the fastening holes 94. That is, abutting contact between the radiator 68 that moves and the power unit 14 disposed on the vehicle rear side of the radiator 68 can be restrained. Consequently, it becomes possible to further reduce the crash load input from the rear side of the radiator 68 to the radiator 68. It should be noted that, by adjusting the dimension and shape of the fastening holes 94, the positional relationship between the radiator 68 and the power unit 14 following a frontal crash can be adjusted.

Furthermore, the easily deformed portions 92 are formed on the opposite sides of the fastening holes 94 across the radiator support portions 66. Consequently, when the braces 90, which relatively move along the fastening holes 94 in the vehicle rearward direction when a crash load is input from the vehicle front direction at the time of a frontal crash, finish moving, the crash load is applied to the braces 90 themselves, and the braces 90 become deformed about the easily deformed portions 92. That is, the origins of the deformation of the braces 90 can be adjusted by the positions of the easily deformed portions 92, so the post-deformation position of the front cross member 44 that becomes displaced by the deformation of the braces 90 can be adjusted. Because of this, an adjustment can be made so as to restrain abutting contact between the front cross member 44 that becomes displaced and the radiator 68, so it becomes possible to further reduce the crash load input from the front side of the radiator 68 to the radiator 68. Because of this, the load input to the radiator 68 at the time of a frontal crash can be reduced even more.

Moreover, because the right and left pair of braces 90 support the vehicle lower side portion 70 of the radiator 68, it becomes unnecessary to use a separate part to support the vehicle lower side portion 70 of the radiator 68. Because of this, a balance can be achieved between reducing manufacturing costs and improving noise and vibration performance. Furthermore, because the vehicle lower side portion 70 of the radiator 68 is supported by the braces 90, it becomes unnecessary to perform the hose connection work from the vehicle lower side of the vehicle 10 in order to interconnect the power unit 14 and the radiator 68. Because of this, the ease of the assembly work can be improved.

Moreover, the fastening holes 94 are configured as long holes, so when fastening the bolts 55 in order to attach the braces 90 to the arm portions 36, shifts in position in the longitudinal direction of the fastening holes 94 are allowed. That is, installation variations when attaching the braces 90 to the vehicle 10 can be absorbed, so the ease of the assembly work can be further improved.

It should be noted that although in the second embodiment the fastening holes 94 are configured as long holes disposed extending in the vehicle forward and rearward direction, the fastening holes 94 are not limited to this, and the direction in which the fastening holes 94 extend may also be changed in accordance with the crash mode of the vehicle. Specifically, in a case where the braces 90 become displaced obliquely in the vehicle rearward direction and outward in the vehicle width direction with respect to the arm portions 36 at the time of a frontal crash, the fastening holes 94 may be configured as long holes disposed extending obliquely in the vehicle rearward direction and inward in the vehicle width direction to thereby allow the braces 90 to be smoothly displaced. Furthermore, in a case where the braces 90 become displaced obliquely in the vehicle rearward direction and inward in the vehicle width direction with respect to the arm portions 36 at the time of a frontal crash, the fastening holes 94 may be configured as long holes disposed extending obliquely in the vehicle forward direction and outward in the vehicle width direction.

Furthermore, the easily deformed portions 92 are given a configuration where the vehicle width direction outside end portions of the braces 90 are partially cut out, but the easily deformed portions 92 are not limited to this and may also be formed in another position. Furthermore, the vehicle front portion structure may also be given a configuration where beads disposed extending along the substantially vehicle width direction are formed in the braces 90 to thereby allow the braces 90 to bend in the vehicle upward and downward direction using the beads as bend portions.

Moreover, the braces 46 and 90 are line symmetric about a hypothetical line disposed extending along the vehicle forward and rearward direction in the center of the vehicle width direction, but the braces 46 and 90 are not limited to this and do not have to be line symmetric. Moreover, the braces 46 and 90 are placed as a right and left pair on the vehicle width direction right side and the vehicle width direction left side, but the braces 46 and 90 are not limited to this and may also have a configuration where they are placed only on either one side in the vehicle width direction.

Embodiments of the present disclosure have been described above, but the present disclosure is not limited to what is described above and can be modified and implemented in a variety of ways other than what is described above without departing from the spirit thereof.

A vehicle front portion structure of a first aspect includes: a suspension member that is disposed on the vehicle lower side of a right and left pair of side members placed in a front portion of a vehicle and is supported on the side members, the suspension member having a main body portion extending in the vehicle width direction and a right and left pair of arm portions extending in the vehicle forward direction from both vehicle width direction end portions of the main body portion; first and second crash boxes that are disposed on front end portions of the right and left pair of arm portions and absorb a crash load input from the vehicle front direction; a front cross member that interconnects, in the vehicle width direction, a front end portion of the first crash box and a front end portion of the second crash box; and braces that extend obliquely outward in the vehicle width direction heading in the vehicle rearward direction, with front end portions of the braces being fastened to the front cross member and rear end portions of the braces being fastened to the arm portions, the braces being equipped with radiator support portions that support a radiator disposed on the vehicle front side of a power unit and easily deformed portions which, when a crash load has been input, become deformation origins when allowing the braces to deform in such a way that the rear end portions move closer to the front cross member.

According to the first aspect, the front end portion of one arm portion and the front end portion of the other arm portion of the suspension member are interconnected in the vehicle width direction by the front cross member via the crash boxes. That is, the suspension member is, including the front cross member, formed in a substantially frame shape as seen in a vehicle plan view. Furthermore, the arm portions of the suspension member and the front cross member are also joined to each other by the braces. The braces extend obliquely outward in the vehicle width direction heading in the vehicle rearward direction, with the front end portions of the braces being joined to the front cross member and the rear end portions of the braces being joined to the arm portions of the suspension member. That is, the front cross member, the arm portions, and the braces are interconnected in such a way as to form triangular shapes as seen in a vehicle plan view. The regions formed in the triangular shapes make it difficult for the vehicle front side portion of the suspension member to become deformed and improve its bending stiffness.

Furthermore, the easily deformed portions are disposed in the braces. Consequently, when a crash load is input from the front cross member to the braces at the time of a frontal crash, the vehicle forward and rearward direction lengths of the braces become shorter as a result of the braces becoming deformed about the easily deformed portions in such a way that the rear end portions of the braces move closer to the front cross member, so the crash load acting on the front cross member can be absorbed mainly by the crash boxes. This makes it possible to reduce the crash load input from the front cross member to the radiator.

A second aspect is the vehicle front portion structure of the first aspect, wherein the easily deformed portions are weak portions formed in positions including vehicle width direction outside end portions of the braces.

According to the second aspect, the easily deformed portions are weak portions formed in positions including the vehicle width direction outside end portions of the braces. Because the braces extend obliquely outward in the vehicle width direction heading in the vehicle rearward direction, when a crash load is input from the front cross member to the braces at the time of a frontal crash, the braces become deformed in such a way as to project inward in the vehicle width direction as seen in a vehicle plan view. Consequently, of the transverse direction end portions of the braces, tensile loads act on the vehicle width direction inside end portions while compressive loads act on the vehicle width direction outside end portions. For this reason, compressive stress arises in the easily deformed portions, but the easily deformed portions have a relatively low stiffness with respect to the compressive loads (a low stiffness compared to the case with respect to the tensile loads), so the braces easily become deformed using the easily deformed portions as origins. That is, by disposing the easily deformed portions in the end portions on which the compressive stress acts, the braces can be more reliably deformed starting at the easily deformed portions.

A third aspect is the vehicle front portion structure of the first or second aspect, wherein the radiator support portions are placed between the easily deformed portions and fastening holes that are formed in the braces and through which are inserted first fasteners for fastening the braces to the front cross member, and the fastening holes are long holes disposed extending along the substantially vehicle forward and rearward direction toward the radiator support portions, the fastening holes being formed so as to maintain a state in which the front cross member and the radiator are spaced apart from each other when the first fasteners have become placed in rear end portions of the fastening holes.

According to the third aspect, the fastening holes formed in the braces are long holes disposed extending along the substantially vehicle forward and rearward direction toward the radiator support portions. Consequently, when a crash load is input from the vehicle front direction at the time of a frontal crash, the front cross member becomes relatively movable with respect to the braces toward the radiator. The fastening holes are formed so as to maintain a state in which the front cross member and the radiator are spaced apart from each other when the first fasteners have become placed in positions corresponding to the rear end portions of the fastening holes. That is, abutting contact between the radiator and the front cross member that has moved can be restrained. Consequently, it becomes possible to further reduce the crash load input from the front side of the radiator to the radiator.

Furthermore, the easily deformed portions are formed on the opposite sides of the fastening holes across the radiator support portions. Consequently, when the fasteners of the front cross member, which moves along the fastening holes toward the radiator when a crash load is input from the vehicle front direction at the time of a frontal crash, come into abutting contact with the rear end portions of the fastening holes, the crash load is applied to the braces themselves, so the braces become deformed about the easily deformed portions. That is, the origins of the deformation of the braces can be adjusted by the positions of the easily deformed portions, so the positions of the radiator support portions that become displaced by the deformation of the braces can be adjusted, and consequently the post-displacement position of the radiator can be adjusted. Because of this, an adjustment can be made so as to restrain abutting contact between the radiator that becomes displaced and the power unit disposed on the vehicle rear side of the radiator, so it becomes possible to further reduce the crash load input from the rear side of the radiator to the radiator.

A fourth aspect is the vehicle front portion structure of the first or second aspect, wherein the radiator support portions are placed between the easily deformed portions and fastening holes that are formed in the braces and through which are inserted second fasteners for fastening the braces to the arm portions, and the fastening holes are long holes disposed extending along the substantially vehicle forward and rearward direction toward the radiator support portions, the fastening holes being formed so as to maintain a state in which the radiator and the power unit are spaced apart from each other when the second fasteners have become placed in front end portions of the fastening holes.

According to the fourth aspect, the fastening holes formed in the braces are long holes disposed extending along the substantially vehicle forward and rearward direction toward the radiator support portions. Consequently, when a crash load is input from the vehicle front direction at the time of a frontal crash, the radiator support portions become relatively movable with respect to the arm portions in the vehicle rearward direction, and consequently the braces also become relatively movable with respect to the arm portions in the vehicle rearward direction. The fastening holes are formed so as to maintain a state in which the radiator and the power unit are spaced apart from each other when the second fasteners have become placed in positions corresponding to the front end portions of the fastening holes. That is, abutting contact between the radiator that moves and the power unit disposed on the vehicle rear side of the radiator can be restrained. Consequently, it becomes possible to further reduce the crash load input from the rear side of the radiator to the radiator.

Furthermore, the easily deformed portions are formed on the opposite sides of the fastening holes across the radiator support portions. Consequently, when the braces, which relatively move along the fastening holes in the vehicle rearward direction when a crash load is input from the vehicle front direction at the time of a frontal crash, finish moving, the crash load is applied to the braces themselves, and the braces become deformed about the easily deformed portions. That is, the origins of the deformation of the braces can be adjusted by the positions of the easily deformed portions, so the post-deformation position of the front cross member that becomes displaced by the deformation of the braces can be adjusted. Because of this, an adjustment can be made so as to restrain abutting contact between the front cross member that becomes displaced and the radiator, so it becomes possible to further reduce the crash load input from the front side of the radiator to the radiator.

The vehicle front portion structure of the present disclosure can reduce the load input to the radiator at the time of a frontal crash.

The vehicle front portion structure of the present disclosure can more reliably reduce the load input to the radiator at the time of a frontal crash.

The vehicle front portion structure of the present disclosure can further reduce the load input to the radiator at the time of a frontal crash.

The invention claimed is:

1. A vehicle front portion structure, comprising:
a suspension member that is provided at a vehicle lower side of a left and right pair of side members disposed at a front portion of a vehicle and that is supported by the side members, the suspension member having a main body portion extending in a vehicle width direction and a left and right pair of arm portions extending in a vehicle forward direction from respective vehicle width direction end portions of the main body portion;
first and second crash boxes that are provided at front end portions of the left and right pair of arm portions and that absorb a crash load input from the vehicle forward direction;
a front cross member that interconnects, in the vehicle width direction, a front end portion of the first crash box and a front end portion of the second crash box; and
braces that extend obliquely outward in the vehicle width direction and toward a vehicle rearward direction, with front end portions of the braces being fastened to the front cross member and rear end portions of the braces being fastened to the arm portions, the braces being equipped with radiator support portions that support a radiator provided at a vehicle front side of a power unit, and with easily deformed portions which, when a crash load has been input, become deformation origins that enable the braces to deform in such a way that the rear end portions move closer to the front cross member, wherein:
the arm portions are positioned below the side members in a vehicle vertical direction,
the front cross member is positioned in front of the first and second crash boxes in the vehicle forward direction,
the front end portions of the braces are connected to the front cross member while being free of a connection to the side members, and
the rear end portions of the braces are connected to the arm portions while being free of a connection to the side members.

2. The vehicle front portion structure according to claim 1, wherein the easily deformed portions are weak portions formed at positions including vehicle width direction outer side end portions of the braces.

3. The vehicle front portion structure according to claim 2, wherein the easily deformed portions are border sections between fixed width portions having a fixed dimension in a transverse direction of the braces, and variable width portions having a varying dimension in the transverse direction, as seen in a vehicle plan view.

4. A vehicle front portion structure, comprising:
a suspension member that is provided at a vehicle lower side of a left and right pair of side members disposed at a front portion of a vehicle and that is supported by the side members, the suspension member having a main body portion extending in a vehicle width direction and a left and right pair of arm portions extending in a vehicle forward direction from respective vehicle width direction end portions of the main body portion;
first and second crash boxes that are provided at front end portions of the left and right pair of arm portions and that absorb a crash load input from the vehicle forward direction;
a front cross member that interconnects, in the vehicle width direction, a front end portion of the first crash box and a front end portion of the second crash box; and
braces that extend obliquely outward in the vehicle width direction and toward a vehicle rearward direction, with front end portions of the braces being fastened to the front cross member and rear end portions of the braces being fastened to the arm portions, the braces being equipped with radiator support portions that support a radiator provided at a vehicle front side of a power unit, and with easily deformed portions which, when a crash load has been input, become deformation origins that enable the braces to deform in such a way that the rear end portions move closer to the front cross member, wherein:
the radiator support portions are disposed between the easily deformed portions and fastening holes that are formed in the braces, first fasteners for fastening the braces to the front cross member being inserted through the fastening holes, and
the fastening holes are long holes provided extending along a substantially vehicle forward and rearward direction toward the radiator support portions, the fastening holes being formed so as to maintain a state in which the front cross member and the radiator are spaced apart from each other when the first fasteners have been disposed in rear end portions of the fastening holes.

5. A vehicle front portion structure, comprising:
a suspension member that is provided at a vehicle lower side of a left and right pair of side members disposed at a front portion of a vehicle and that is supported by the side members, the suspension member having a main body portion extending in a vehicle width direction and a left and right pair of arm portions extending in a vehicle forward direction from respective vehicle width direction end portions of the main body portion;
first and second crash boxes that are provided at front end portions of the left and right pair of arm portions and that absorb a crash load input from the vehicle forward direction;
a front cross member that interconnects, in the vehicle width direction, a front end portion of the first crash box and a front end portion of the second crash box; and
braces that extend obliquely outward in the vehicle width direction and toward a vehicle rearward direction, with front end portions of the braces being fastened to the front cross member and rear end portions of the braces being fastened to the arm portions, the braces being equipped with radiator support portions that support a radiator provided at a vehicle front side of a power unit, and with easily deformed portions which, when a crash load has been input, become deformation origins that enable the braces to deform in such a way that the rear end portions move closer to the front cross member, wherein:
the radiator support portions are disposed between the easily deformed portions and fastening holes that are formed in the braces, second fasteners for fastening the braces to the arm portions being inserted through the fastening holes, and
the fastening holes are long holes provided extending along a substantially vehicle forward and rearward direction toward the radiator support portions, the fastening holes being formed so as to maintain a state in which the radiator and the power unit are spaced apart from each other when the second fasteners have been disposed in front end portions of the fastening holes.

6. The vehicle front portion structure according to claim 5, wherein the easily deformed portions have shapes that are recessed in a vehicle upward direction with respect to common surfaces of the braces and whereby vehicle width direction outer side end portions of the braces are partially cut out.

* * * * *